United States Patent Office 3,795,692
Patented Mar. 5, 1974

3,795,692
COMPOUNDS AND PROCESSES
Peter Kulsa, Scotch Plains, and Frank S. Waksmunski, South River, N.J., assignors to Merck & Co., Inc., Rahway, N.J.
No Drawing. Filed Mar. 24, 1972, Ser. No. 237,934
Int. Cl. C07c 129/00
U.S. Cl. 260—465 E  7 Claims

ABSTRACT OF THE DISCLOSURE 1-(p-nitrobenzilidineamino)-3-(substituted benzilidineamino) guanidine compounds are active anti-coccidial agents. Said compounds are prepared by successively reacting a diaminoguanidine with appropriately substituted aldehydes or ketones. Compositions employing the above compounds for the treatment and prevention of coccidiosis are also disclosed.

SUMMARY OF THE INVENTION

This invention is concerned with novel compounds which are substituted diaminoguanidines which are useful for the prevention and cure of coccidiosis in poultry. The diaminoguanidines of this application are described generally by the following structural formula:

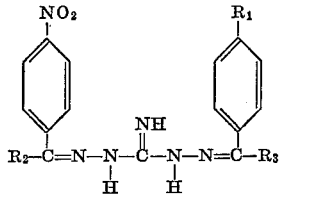

wherein $R_1$ is nitro, halogen, trifluoromethyl, cyano, or trifluoromethoxy. $R_2$ and $R_3$ are each hydrogen or loweralkyl. In the instant application the term "halogen" is deemed to include the halogen atoms of fluorine, chlorine, or bromine; and the term "loweralkyl" includes those straight or branched alkyl chains containing from 1 to 6 carbon atoms.

It is thus an object of this invention to provide novel substituted guandine compounds. Another object of this invention is to provide processes for the preparation of the above-identified diaminoguanidines. A further object is to provide means for preventing and combatting coccidiosis using the above compounds as anticoccidial agents. Further objects of this invention will become apparent with a full reading of the instant disclosure.

DETAILED DESCRIPTION OF THE INVENTION

Coccidiosis is a widespread poultry disease involving the invasion of coecal and intestinal mucosa by coccidia, specifically protozoan parasites of the genus Eimeria. The most important of these species is E. maxima, E. acervulina, E. tenella, E. necatrix, E. brunetti, E. praecox, and E. mitis, when left untreated, the severe forms of the disease leads to poor weight gain, reduced feed efficiency, reduced egg production, and high mortality. For these reasons, the control of coccidiosis is highly important to the poultry industry.

According to the present invention it has now been found that the substituted diaminoguanidines of Formula I above have a significant degree of activity against coccidiosis, particularly against poultry coccidiosis. Of the novel compounds represented by Formula I there are preferred those wherein $R_1$ is chloro or trifluoromethyl and $R_2$ and $R_3$ are each hydrogen or methyl.

It will be appreciated by those skilled in this art that the substituted diaminoguanidines described form acid addition salts and indeed it is preferred to synthesize and use these compounds in the form of such salts. The particular salt is not critical although it should be one that is non-toxic for poultry at the dose levels used for these coccidiostats. Among the preferred salts are the hydrochloride, hydrobromide, nitrate, sulfate, phosphate, and the like, e.g., salts of pharmaceutically acceptable acids. Salts with organic acids may be utilized and typical examples of these are the citrate, acetate, naphthoate, benzoate, and the like. Any particular salt is conveniently obtained by contacting the free base in a solution with the appropriate acid.

The compounds of this invention are generally prepared in two steps starting with a N,N' diaminoguanidine, which is reacted successively with a selected substituted aldehyde or ketone as outlined in the following reaction scheme:

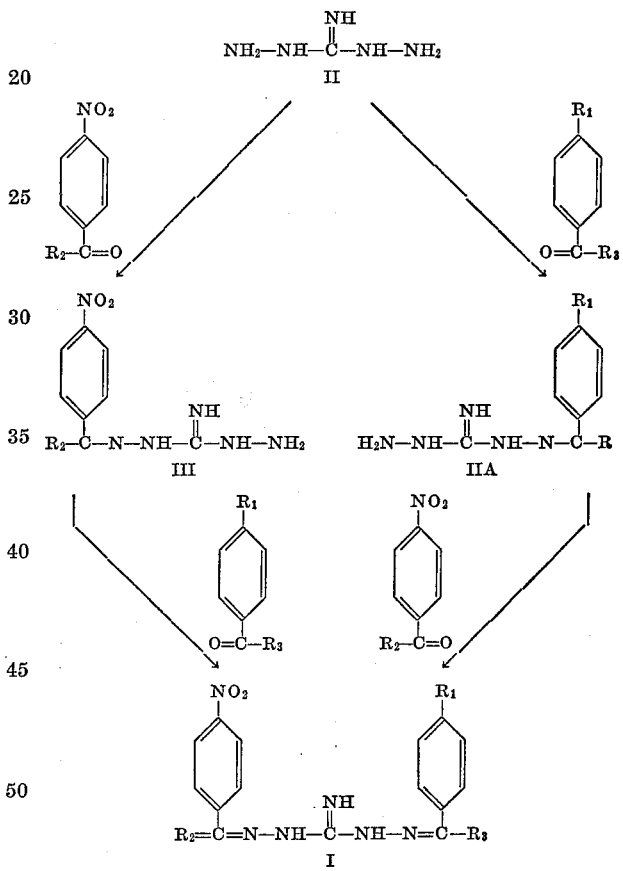

wherein $R_1$, $R_2$, and $R_3$ are as defined above.

In the case where $R_1$ is nitro and $R_2=R_3$ the procedure need not be carried out in two steps but rather in one step, without the isolation of the mono-adducts III and IIIA. In such cases two moles of the aldehyde or ketone are employed for each mole of N,N' diaminoguanidine.

In the case where an asymmetrical compound is to be prepared, the diaminoguanidine is dissolved in an appropriate solvent, such as a loweralkanol, and treated with a mineral acid until the solution is acidic. Mineral acids such as hydrochloric, nitric, sulfuric, and phosphoric may be employed although hydrochloric acid is preferred. The hydrochloric acid can be employed either as a concentrated aqueous solution or as an anhydrous solution of hydrogen chloride in a loweralkanol. The presence of the small amounts of water added by the use of aqueous acids has no adverse effect on the reaction. Alternatively the acid addition salt of the diaminoguanidine can be employed with equal results. The hydrochloride salt of diaminoguanidine is preferred.

To this solution is added an equimolar quantity of the aldehyde or ketone and the reaction mixture is stirred at from 10 to 50° C. for from 1 hour to 3 days. It is preferred to run the reaction at about room temperature for a duration of less than 24 hours. The progress of the reaction is readily followed by a thin layer chromatographic analysis of a portion of the reaction. It is desired to maximize the formation of the mono-adduct; however, if the reaction is made too warm or run longer than necessary, there will be formed some symmetrical disubstituted compound. When the reaction is complete it is worked up using techniques known to those skilled in this art.

For the second portion of the reaction scheme the mono-adduct (III and IIIA) is dissolved in a loweralkanol and, unless the acid addition salt is employed, made acidic with a mineral acid as discussed hereinabove. The aldehyde or ketone which is to form the second adduct is added to the solution in a quantity which may excede a molar equivalent if desired. Since disubstitution with the second aldehyde or ketone is not possible, somewhat more vigorous condition may be employed than was employed in the first step although they are not necessary. The second step is usually run at from 10° C. to the reflux temperature of the reaction mixture for from 10 minutes to 2 days. The duration of the reaction is inversely proportional to the reaction so that higher temperatures will require shorter reaction times. It is preferred that the reaction be run at about room temperature for from 12 hours to 2 days. The product (Compound I) is isolated by techniques known to those skilled in this art.

In the preparation of the symmetrical compounds where $R_1=NO_2$ and $R_2=R_3$, the diaminoguanidine is combined in acidic loweralkanol, or the acid addition salt is employed as discussed hereinabove, and at least two molar equivalents of the aldehyde or ketone added. The mixture is stirred at from 10° C. to the reflux temperature of the reaction mixture for from 10 minutes to 3 days, preferably at room temperature for from 12 hours to 2 days. The product is isolated as above.

Generally the acid addition salt of the desired product is isolated owing to the acidic nature of the reaction mixture. Said acid addition salts are to be considered an integral part of the compounds of this invention. The acid addition salt may be converted to the free base thereof by reacting a solution of the acid salt in water or an organic solvent with a base such as an alkali metal or alkaline earth metal hydroxide, carbonate or bicarbonate. The free base is isolated by extraction, filtration or other suitable techniques known to those skilled in this art.

As previously stated, the substituted diaminoguanidines of Formula I above and the acid addition salts thereof, are highly effective for the treatment and prevention of coccidiosis.

In using the compounds of this invention in the treatment and prevention of coccidiosis, they are conveniently fed to poultry as a component of the feed of the animals although they may also be given dissolved or suspended in the drinking water. According to one aspect of the invention, novel compositions are provided in which the novel compounds described herein are present as an active anticoccidial ingredient. Such compositions comprise such compound(s) intimately dispersed or admixed with an inert carrier or diluent. By an inert carrier is meant one that is nonreactive with respect to the drug and that may be administered with safety to the animals. The carrier or diluent is preferably one that is or may be an ingredient of the animal feed and is usually itself a nutritive element of poultry sustenance.

The compositions which are a preferred feature of this aspect of the invention are the so-called feed supplements in which the active ingredient is present in relatively large amounts and which are suitable for addition to the poultry feed either directly or after an intermediate dilution or blending step. Examples of carriers or diluents suitable for such compositions are solid, orally ingestable, nutritive carriers such as distillers' dried grains, corn meal, citrus meal, fermentation residues, ground oyster shells, wheat shorts, molasses solubles, corn cob meal, edible vegetable substances, toasted dehulled soya flour, soybean mill feed, antibiotic mycelia, soya grits, crushed limestone and the like. The guanidine derivative is intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 2% to about 40% weight, and preferably from about 5 to 30% by weight of active ingredient are particularly suitable for addition to poultry feeds, and compositions containing from about 10 to 25% by weight of guanidine compounds are very satisfactory. The active compound is normally dispersed or mixed uniformly in the diluent but in some instances may be sorbed on the carrier. The optimal concentration of coccidiostat in these feed supplements will depend to some extent on the particular compound employed. Since it is convenient for the feed manufacturer to use about one pound of feed supplement for each ton of finished feed, the preferred concentration of any one of these coccidiostats in a feed supplement is partly a function of the level of active ingredient desired in the finished feed.

Examples of typical feed supplements containing a compound of this invention dispersed in a solid carrier are:

(A)

| | Lbs. |
|---|---|
| 1 - (p - nitrobenzilidineamino) - 3 - (p - trifluoromethyl-α-methylbenzilidineamino) guanidine | 25.0 |
| Wheat shorts | 75.0 |

(B)

| | |
|---|---|
| 1 - (p - chloro - α - methylbenzilidineamino) - 3 - (p-nitrobenzilidineamino) guanidine | 10.0 |
| Soya grits | 90.0 |

(C)

| | |
|---|---|
| 1 - (p - cyanobenzilidineamino) - 3 - (p-nitrobenzilidineamino) guanidine | 15.0 |
| Corn distillers' dried grains | 85.0 |

(D)

| | |
|---|---|
| 1 - (p - nitrobenzilidineamino) - 3 - (p - trifluoromethoxybenzilidineamino) guanidine | 15.0 |
| Amprolium | 20.0 |
| Wheat standard middlings | 65.0 |

These and similar feed supplements are prepared by uniformly mixing the guanidine with the carrier or carriers.

The feed supplements of the type illustrated hereinabove are usually further diluted with materials such as corn meal or soybean meal before being incorporated in the animal feed. In this intermediate processing step the level of coccidiostat in the carrier is brought down to from about 0.1% to about 1.0% by weight. This dilution serves to facilitate uniform distribution of the substance in the finished feed. The finished feed is one that contains a source of fat, protein, carbohydrate, minerals, vitamins, and other nutritional factors.

The amount of the compounds of Formula I required for effective control of coccidiosis will depend upon factors such as the specific compound employed, the type and severity of infection, and duration of treatment. In any event, only a minor amount is necessary in relation to the total feed or drinking water consumption. Good prophylactic results are achieved when the feed administered to poultry contains from about 0.003% to about 0.05% by weight of guanidine compound, and preferably from about 0.01% to about 0.025% by weight. For therapeutic use, higher levels of up to 0.1% by weight of feed may be used effectively for short periods of time.

Administration via the drinking water of the birds is often employed in the therapeutic use of the compounds since poultry with coccidiosis are apt to consume less solid feed than normal birds. The compounds may be added directly to the drinking water. Alternatively, water-soluble acid addition salts may be used, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from 1 to 25% by weight of active compound are suitable.

According to an additional aspect of this invention, there are provided anticoccidial compositions containing a guanidine of Formula I above together with a second coccidiostat such as amprolium, zoalene, nicarbazin, ethopabate, and the like. The nature of the second coccidiostat is not critical, and its presence frequently permits using lower feed levels of guanidine compound than would otherwise be required. The feed compositions may also contain other substances useful for poultry well-being such as vitamins, antibiotics, growth promotants, or antiviral agents.

The following examples are presented so that the invention might be fully understood. They are not to be construed as being limitative of the invention.

EXAMPLE 1

1-(p-chloro-α-methylbenzylidineamino)-3-(p-nitrobenzylidineamino) guanidine

A solution of 2.6 g. (0.01 mole) of 1-amino-3-(p-chloro-α-methylbenzylidineamino) guanidine hydrochloride in 200 ml. of methanol is combined with 1.51 g. (0.01 mole) of p-nitrobenzaldehyde and stirred at room temperature for 1½ hours. The reaction mixture is filtered affording 1 - (p-chloro-α-methylbenzylidineamino)-3-(p-nitrobenzylidineamino) guanidine, M.P. 280 to 285° C.

EXAMPLE 2

1-(p-nitrobenzylidineamino)-3-(p-trifluoromethylbenzylidineamino) guanidine 0.222 g. (0.001 mole) of 1-amino-3-(p-nitrobenzylidineamino) guanidine is dissolved in 125 ml. of methanol and treated with concentrated hydrochloric acid until the resultant solution is acidic. 0.870 g. (0.005 mole) of p-trifluoromethylbenzaldehyde is added and the reaction mixture stirred at room temperature for 2 days. The reaction mixture is concentrated in vacuo and filtered affording 1 - (p-nitrobenzylidineamino) - 3 - (p-trifluoromethylbenzylidineamino) guanidine, M.P. 258 to 261° C.

EXAMPLE 3

1-(p-nitrobenzylidineamino)-3-(p-cyanobenzylidineamino) guanidine

To a suspension of 0.222 g. (0.001 mole) of 1-amino-3-(p-nitrobenzylidineamino) guanidine in 100 ml. of methanol is added concentrated hydrochloric acid until the resultant solution is acidic. 0.26 g. (0.002 mole) of p-cyanobenzaldehyde is added and the solution is stirred for 3 days at room temperature. The reaction mixture is filtered affording 150 mg. of 1-(p-nitrobenzylidineamino) - 3 - p-cyanobenzylidineamino) guanidine, M.P. 285 to 288° C.

EXAMPLE 4

1,3-bis-(p-nitro-α-methylbenzylidineamino) guanidine

A solution of 16.8 g. (0.12 mole) of N,N'-diaminoguanidine hydrochloride is dissolved in 100 ml. of methanol and heated to reflux. A solution of 9.9 g. (0.06 mole) of p-nitroacetophenone in 400 ml. of methanol is added dropwise and the reaction mixture is filtered and the residue recrystallized from methanol affording 1,3-bis-(p-nitro-α-methylbenzylidineamino) guanidine, M.P. 328° C. with decomposition.

Ether is added to the filtrate and the crystalline precipitate collected by filtration, washed with aqueous sodium bicarbonate solution and water. The solid material is dried and chromatographed on silical gel eluting with 10% methanol in chloroform. There is obtained 2.8 g. of 1-amino - 3 - (p-nitro-α-methylbenzylidineamino) guanidine, M.P. 275 to 277° C.

EXAMPLE 5

1,3-bis-(p-nitrobenzylidineamino) guanidine 3.32 g. (0.022 mole) of p-nitrobenzaldehyde, 1.39 g. (0.01 mole) of N,N'-diaminoguanidine, and 100 ml. of methanol are combined and heated at reflux for one hour. There is an almost immediate precipitate. The reaction mixture is filtered and washed with methanol and ether affording 1.9 g. of 1,3-bis-(p-nitrobenzylidineamino) guanidine, M.P. 285° C. with decomposition.

EXAMPLE 6

1-(p-nitrobenzylidenamino)-3-(p-trifluoromethyl-α-methylbenzylidineamino) guanidine 518 mg. of 1 - amino-3-(p-trifluoromethyl-α-methylbenzylidineamino) guanidine is suspended in 50 ml. of methanol and combined with 1.1 ml. of 2 N methanolic HCl and 332 mg. of p-nitrobenzaldehyde. The reaction mixture is stirred at room temperature for 2 days and concentrated in vacuo at room temperature to a total volume of 20 ml. The concentrated suspension is stirred at room temperature for 2 hours and the solid material filtered, washed with methanol and ether affording 130 mg. of 1-(p-nitrobenzylidineamino)-3-(p-trifluoromethyl-α-methylbenzylidineamino) guanidine, M.P. 285° C. with decomposition.

EXAMPLE 7

1 - (p - nitro-α-methylbenzylidineamino)-3-(p-trifluoromethyl - α-methylbenzylidineamino) guanidine hydrochloride 518 mg. of 1 - amino-3-(p-trifluoromethyl-α-methylbenzylidineamino) guanidine is suspended with 30 ml. of methanol containing 1.1 ml. of 2 N methanolic HCl. 363 mg. of p-nitroacetophenone is added and the reaction mixture is stirred at room temperature for 20 hours. The reaction mixture is filtered and the filtered material washed with methanol, ether, and dried in air affording 500 mg. of 1 - (p-nitro-α-methylbenzylidineamino)-3-(p-trifluoromethyl - α - methylbenzylidineamino) guanidine hydrochloride, M.P. 308° C. with decomposition.

EXAMPLE 8

1-(p-cyanobenzylidineamino)-3-(p-nitro-α-methylbenzylidineamino) guanidine hydrochloride 472 mg. of 1 - amino-3-(p-nitro-α-methylbenzylidineamino) guanidine is suspended in 100 ml. of methanol containing 1.1 ml. of 2 N methanolic HCl. 288 mg. of p-cyanobenzaldehyde is added and the reaction mixture stirred at room temperature for 20 hours. The reaction mixture is filtered and the solid material washed with methanol and dried in air affording 224 mg. of 1-(p-cyanobenzylidineamino) - 3 - (p - nitro-α-methylbenzylidineamino) guanidine hydrochloride, M.P. 295° C. with decomposition.

EXAMPLE 9

1-(p-nitro-α-methylbenzylidineamino)-3-(p-trifluoromethylbenzylidineamino) guanidine hydrochloride 472 mg. (0.002 mole) of 1-amino-3-(p-nitro-α-methylbenzylidineamino) guanidine is suspended in 135 ml. of methanol containing 1.1 ml. of 2 N methanolic HCl. 522 mg. (0.003 mole) of p-trifluoromethylbenzaldehyde is added and the reaction mixture is stirred at room temperature for 20 hours. A thin layer chromatographic analysis of an aliquot portion of the reaction mixture shows predominantly starting material. An additional 1.0 g. of p-trifluoromethylbenzaldehyde is added and the reaction mixture is stirred at room temperature for 2 days. The reaction mixture is concentrated to a volume of 50 ml. and the concentrated suspension stirred at room temperature for 2½ hours. The suspension is filtered and the solid material washed with cold methanol and dried in air affording 247 mg. 1-(p-nitro-α-methylbenzylidineamino)-3-(p - trifluoromethylbenzylidineamino) guanidine hydrochloride, M.P. 245° C. with decomposition.

EXAMPLE 10

1-(p-nitro-α-methylbenzylidineamino)-3-(p-trifluoromethoxybenzylidineamino) guanidine hydrochloride 472 mg. (2.0 mmoles) of 1-amino-3-(p-nitro-α-methylbenzylidineamino) guanidine is dissolved in 100 ml. of methanol containing 1.1 ml. (2.2 mmoles) of 2 N methanolic HCl. 418 mg. (2.2 mmoles) of p-trifluoromethoxybenzylaldehyde in 5 ml. of methanol is added in one portion and the reaction mixture is stirred at room temperature for 4 hours. A thin layer chromatographic analysis reveals a very large amount of unreacting starting material present. An additional 750 mg. of p-trifluoromethoxybenzylaldehyde is added and the reaction mixture is stirred at room temperature overnight. The reaction mixture is concentrated in vacuo at room temperature to a volume of about 25 ml. The concentrate is stirred at room temperature for 3 hours, filtered, and the solid material washed with methanol. There is afforded 412 mg. of 1-(p - nitro - α-methylbenzylidineamino)-3-(p-trifluoromethoxybenzylidineamino) guanidine hydrochloride, M.P. 270 to 272° C. with decomposition.

The following examples demonstrate the preparation of the mono-adduct from equal molar equivalents of an aldehyde (or ketone) and N,N'-diaminoguanidine.

EXAMPLE 11

1-amino-3-(p-nitrobenzylidineamino) guanidine

A solution of 5.0 g. (0.04 mole) of N,N'-diaminoguanidine hydrochloride in 200 ml of methanol at reflux is combined with 3.0 g. (0.02 mole) of 4-nitrobenzaldehyde and refluxed for one hour. The reaction mixture is filtered without cooling. The filtrate is concentrated in vacuo and combined with an equal volume of ethyl ether. The precipitate is filtered and washed with aqueous sodium bicarbonate solution affording 1.7 g. of crude product which is chromatographed on 50 g. of silica gel eluting with 10% methanol in chloroform. Evaporation of the eluant affords 1.4 g. of 1-amino-3-(p-nitrobenzylidineaamino) guanidine.

EXAMPLE 12

1-amino-3-(p-chloro-α-methylbenzylidineamino) guanidine

A solution of 25 g. (0.2 mole) of N,N'-diaminoguanidine hydrochloride in 400 ml· of refluxing methanol is combined with 15.5 g. (0.1 mole) of p-chloroacetophenone and the reaction mixture is refluxed for 15 minutes. The reaction mixture is cooled and filtered and the filtrate treated with about 5 volumes of ethyl ether and filtered. The solid material is partitioned between 300 ml. of aqueous sodium bicarbonate solution and 300 ml. of methylene chloride. Filtration of the mixture affords 9.5 g. of 1 - amino - 3-(p-chloro-α-methylbenzylidineamino) guanidine.

The mono-adduct above may be dissolved in methanol and treated with concentrated aqueous hydrochloric acid until acidic. The addition of several volumes of ethyl ether affords the hydrochloride salt of 1 - amino-3-(p-chloro-α-methylbenzylidineamino) guanidine.

EXAMPLE 13

1-amino-3-(p-trifluoromethyl-α-methylbenzylidineamino) guanidine

A refluxing solution of 8.4 g. (0.06 mole) of N,N'-diaminoguanidine hydrochloride in 200 ml. of methanol is combined with a solution of 5.64 g. (0.03 mole) of p-trifluoromethylacetophenone in 20 ml. of methanol. The reaction mixture is refluxed for 15 minutes, cooled, and filtered. The filtrate is treated with about 5 volumes of ether, filtered, and the solid material washed with aqueous sodium bicarbonate solution and water. The solid material is dried and washed with ether affording 1-amino-3-(p-trifluoromethyl-α-methylbenzylidineamino) guanidine, M.P. 135 to 137° C.

What is claimed is:
1. A compound having the formula:

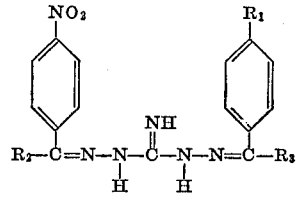

wherein $R_1$ is nitro, halogen, trifluoromethyl, trifluoromethoxy, or cyano; and $R_2$ and $R_3$ are each hydrogen or loweralkyl, or a salt thereof with a pharmaceutically acceptable acid.

2. The compound of claim 1 wherein $R_1$ is nitro and $R_2$ and $R_3$ are each hydrogen or methyl.
3. The compound of claim 1 wherein $R_1$ is halogen and $R_2$ and $R_3$ are each hydrogen or methyl.
4. The compound of claim 1 wherein $R_1$ is trifluoromethyl and $R_2$ and $R_3$ are each hydrogen or methyl.
5. The compound of claim 1 wherein $R_1$ is trifluoromethoxy and $R_2$ and $R_3$ are each hydrogen or methyl.
6. The compound of claim 1 wherein $R_1$ is cyano and $R_2$ and $R_3$ are each hydrogen or methyl.
7. A compound having the formula:

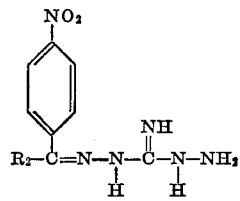

wherein $R_2$ is hydrogen or loweralkyl or a salt thereof with a pharmaceutically acceptable acid.

References Cited
UNITED STATES PATENTS
3,456,059   1/1969   Wick et al. _____ 260—564 B LEON ZITVER, Primary Examiner G. A. SCHWARTZ, Assistant Examiner U.S. Cl. X.R.

260—501.14, 564 B; 424—304, 326